United States Patent

[11] 3,593,217

[72] Inventor Roger L. Weber
Richardson, Tex.

[21] Appl. No. 678,619
[22] Filed Oct. 27, 1967
[45] Patented July 13, 1971
[73] Assignee Texas Instruments Incorporated
Dallas, Tex.

[54] SUBMINIATURE TUNABLE CIRCUITS IN MODULAR FORM AND METHOD FOR MAKING SAME
14 Claims, 18 Drawing Figs.

[52] U.S. Cl. ........ 333/70, 333/76, 333/78, 317/256, 336/65, 336/221
[51] Int. Cl. ........ H03h 3/00, H03h 5/06, H01j 15/02
[50] Field of Search ........ 333/705, 78, 76, 70; 336/65, 221, 233, 234; 317/256, 101 C, 101 CB, 101 CC; 29/414, 417, 602, 603, 607, 608

[56] References Cited

UNITED STATES PATENTS

| | | | |
|---|---|---|---|
| 3,295,056 | 12/1966 | Matsushima et al. | 333/70 X |
| 2,143,298 | 1/1939 | Broucke | 336/233 X |
| 2,325,832 | 8/1943 | Christensen | 29/607 |
| 2,648,804 | 8/1953 | Steigerwalt et al. | 317/101 (C) |
| 3,183,407 | 5/1965 | Yasuda et al. | 317/101 (C) |
| 3,254,400 | 6/1966 | Gordon | 29/414 |
| 3,289,276 | 12/1966 | Wasyluk | 317/256 |
| 3,353,261 | 11/1967 | Bradfor et al. | 29/603 |
| 3,354,540 | 11/1967 | Duinker | 29/608 |
| 3,390,451 | 7/1968 | Peloschek | 29/603 |
| 3,444,436 | 5/1969 | Coda | 317/261 X |

FOREIGN PATENTS

| | | | |
|---|---|---|---|
| 626,596 | 6/1963 | Belgium | 317/101 (C) |

OTHER REFERENCES

IBM TECHNICAL DISCLOSURE BULLETIN, "Additive Multilayer Circuit," Vol. 8 #11 April 1966, 1482

*Primary Examiner*—Herman Karl Saalbach
*Assistant Examiner*—Wm. N. Punter
*Attorneys*—Samuel M. Mims, Jr., James O. Dixon, Andrew M. Hassell, Harold Levine, Melvin Sharp, John E. Vandigriff and James C. Fails

ABSTRACT: Disclosed is a subminiature tunable circuit in modular form and the method of making the modular circuit. A capacitor is mounted on an inductor to form a modular tunable circuit. By appropriate connections, either series or parallel reactive circuits are formed with intermediate tap connections, when desired. The circuit is tuned by changing the value of the capacitor by air abrasion techniques.

PATENTED JUL 13 1971

3,593,217

ROGER L. WEBER
INVENTOR

BY [signature]

ATTORNEY

SUBMINIATURE TUNABLE CIRCUITS IN MODULAR FORM AND METHOD FOR MAKING SAME

This invention relates to modular components and more particularly to a subminiature modular circuit formed of reactive components.

Due to the relatively large size of presently available tunable components, there is a need in the electronics industry today for a subminiature resonant of antiresonant circuit which is compatible in size and manufacturing processes with monolithic, thin-film and thick film components of the complete circuit, of which the reactive circuit is a part. The present necessity of placing large size tunable components in positions separate from the rest of the circuit limits the desired reduction in the total space occupied by the complete circuit. A typical application for a modular tunable circuit allows, for example, only a space of about 0.125 inches × 0.075 inches × 0.100 inches, or only a volume of less that 0.00094 cubic inch for such a circuit. Such limited space is insufficient to accommodate separately positioned toroidal inductors and capacitors as the reactive elements of the circuit. Moreover, because the winding of a closed core toroidal inductor does not lend itself to efficient mechanical winding, the fabrication of subminiature modular circuits containing such inductors is time consuming and therefore expensive. When coupled with the necessity of separately mounting the reactive components as part of a subminiature modular circuit, the use of such circuits in certain applications is severely limited.

One object of the invention is a subminiature inductor for a modular circuit which can be easily mounted on a support which also supports all the other components of the circuit.

Another object of the invention is a subminiature core for a modular circuit which can be wound at a much faster speed than a conventional toroidal core.

Still another object of the invention is a subminiature modular tunable circuit having an adjustable capacitor bonded to an inductor.

One feature of the invention is a core for a subminiature inductor having integral bonding pads for connection in a modular circuit.

Yet another object of the invention is a method of forming a subminiature modular circuit having an adjustable capacitor mounted on an inductor.

A further object of the invention is a method of forming a subminiature core for an inductor having integral bonding pads for connection in a modular circuit.

A still further object of the invention is a method of forming a subminiature core for an inductor which can be wound at a much faster speed than a conventional toroidal core.

The novel features believed to be characteristic of this invention are set forth with particularity in the appended claims. The invention itself, however, as well as further objects and advantages thereof may be best understood from the following detailed description when read in conjunction with the accompanying drawings, wherein:

Figure 2:
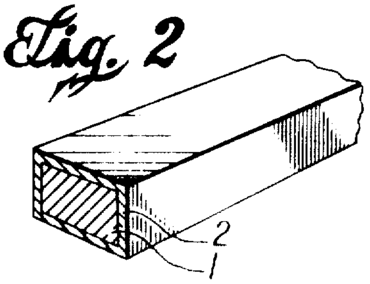
FIG. 2 is a pictorial view in section, illustrating one of the bars of FIG. 1 after the bar has been covered with a layer of metal.
Figure 3A:
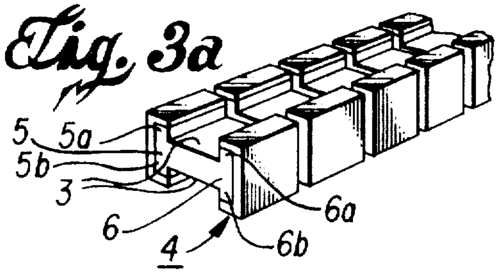
Figure 3B:
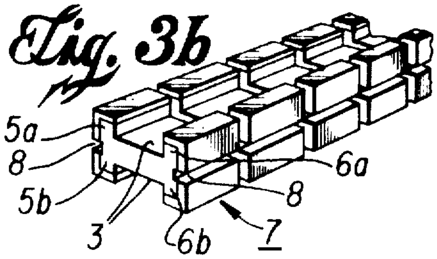
Figures 4, 6:
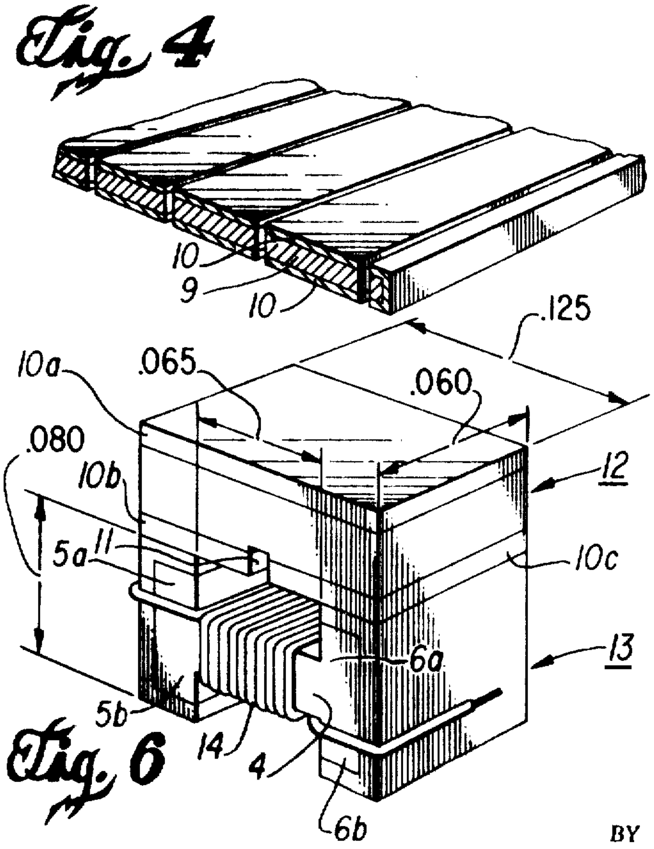
Figure 5:
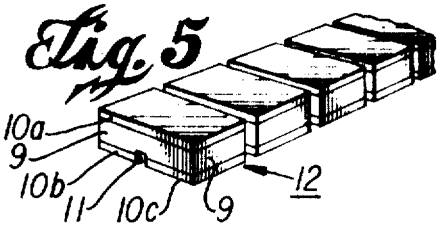
Figures 7A, 7B, 8A, 8B, 9A, 9B:
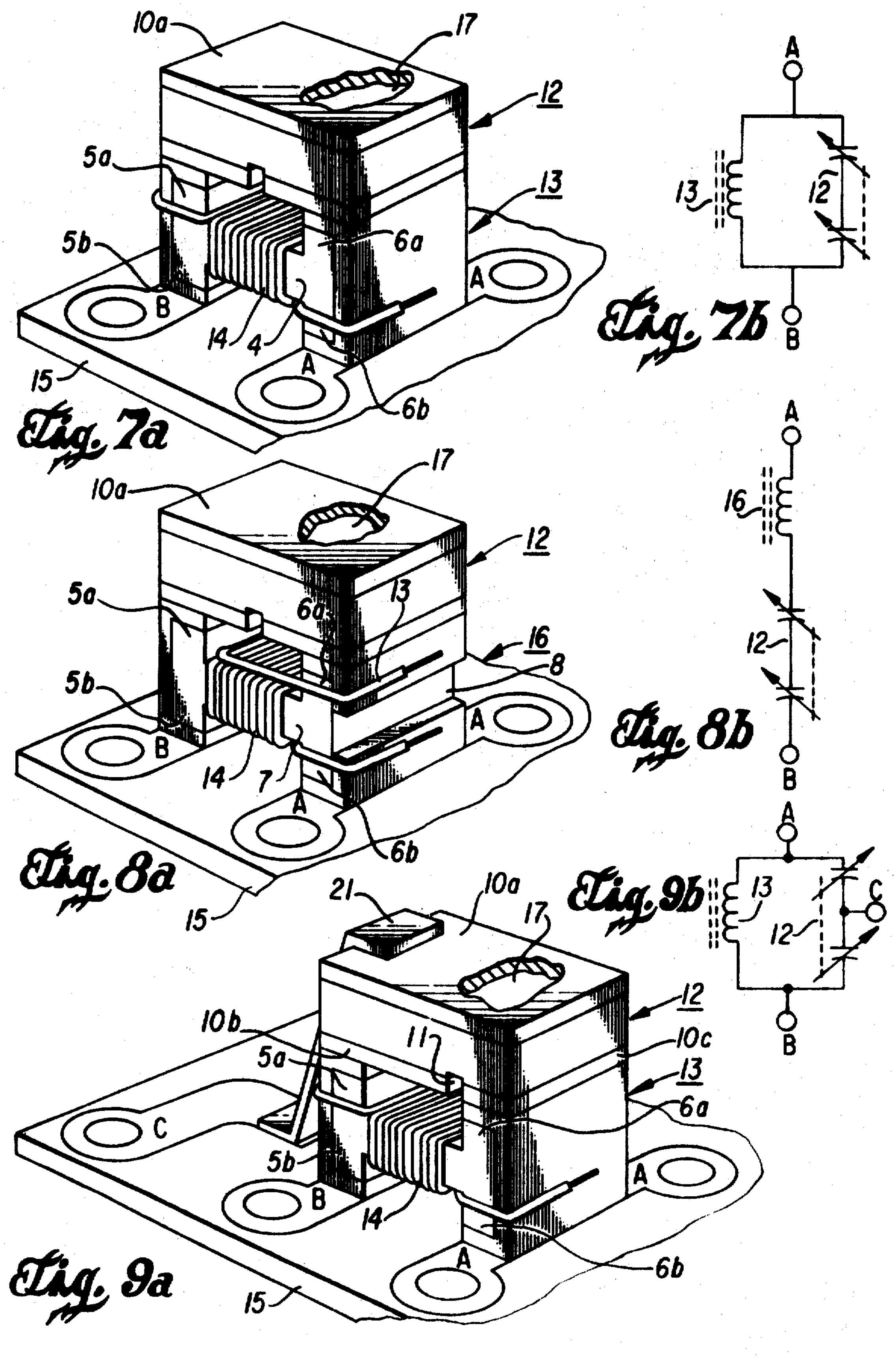
Figures 10A, 10B, 11A, 11B:
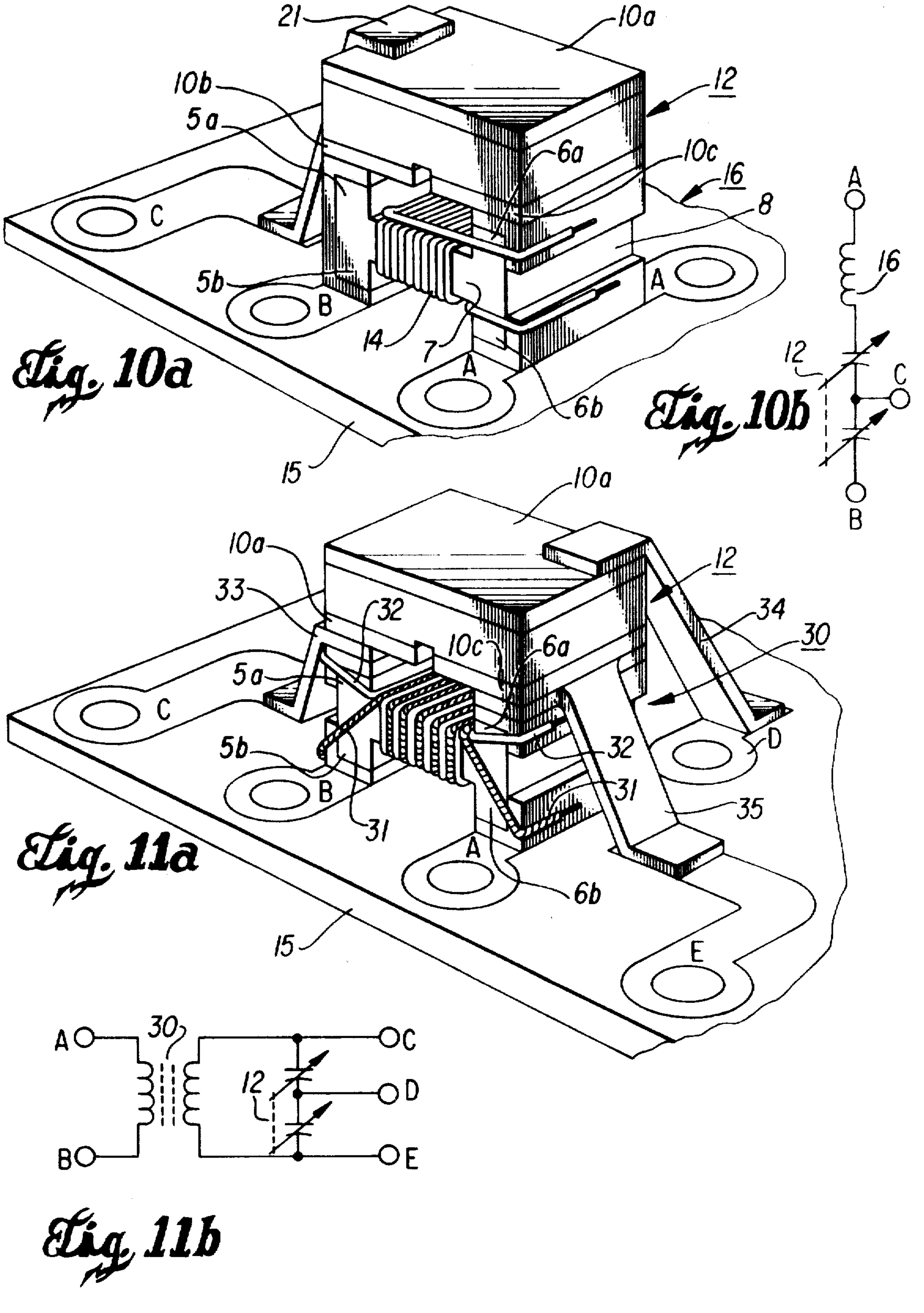
Figure 12:
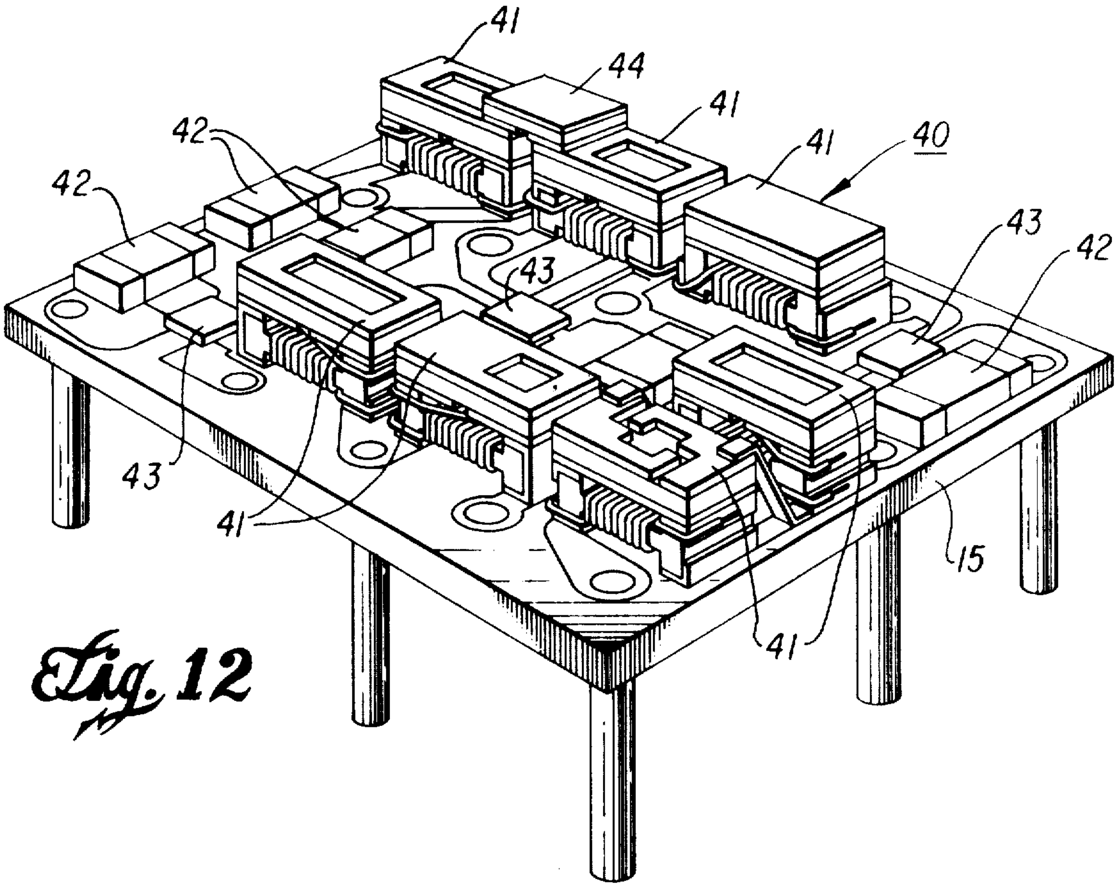

FIG. 3*a* is a pictorial view, illustrating a number of individual cores that have been cut from the bar of FIG. 2 after a wide groove has been formed down the length of each of two opposite metal covered surfaces of the bar;

FIG. 3*b* is a pictorial view, illustrating a number of individual cores that have been cut from the bar of FIG. 2 after a wide groove has been formed down the length of each of two opposite metal covered surfaces of the bar and after a narrow groove has been formed down the length of each of the two other opposite metal covered surfaces of the bar;

FIG. 4 is a pictorial view in section, illustrating a number of individual bars that have been cut from a metal covered slab of dielectric material;

FIG. 5 is a pictorial view, illustrating a number of individual capacitors that have been cut from one of the bars of FIG. 4 after a narrow groove has been formed down the length of one metal covered surface of the bar;

FIG. 6 is a pictorial view, illustrating the combination of one of the capacitors of FIG. 5 and an inductor formed from one of the cores of FIG. 3*a*;

FIG. 7*a* is a pictorial view, illustrating a modular antiresonant circuit;

FIG. 7*b* is a schematic diagram of the electrical circuit embodied in FIG. 7*a*;

FIG. 8*a* is a pictorial view, illustrating a modular resonant circuit assembly;

FIG. 8*b* is a schematic diagram of the electrical circuit embodied in FIG. 8*a*;

FIG. 9*a* is a pictorial view, illustrating a modular antiresonant circuit with an impedance transforming tap connection;

FIG. 9*b* is a schematic diagram of the electrical circuit embodied in FIG. 9*a*;

FIG. 10*a* is a pictorial view, illustrating a modular resonant circuit with an impedance transforming tap connection;

FIG. 10*b* is a schematic diagram of the electrical circuit embodied in FIG. 10*a*;

FIG. 11*a* is a pictorial view, illustrating a modular antiresonant circuit having a transformer with an untuned primary and a tuned secondary with an impedance transforming tap connection;

FIG. 11*b* is a schematic diagram of the electrical circuit embodied in FIG. 11*a*; and FIG. 12 is a pictorial view, illustrating a number of reactive circuits in a television video IF amplifier.

All of the structures illustrated in FIGS. 7*a*—12 are constructed according to the principles of the invention.

Briefly, the invention involves a capacitor mounted on an inductor in the shape of an H to form the components of a subminiature reactive circuit in modular form and the method of making the inductor and the modular reactive circuit. The reactive circuit is tuned by adjusting the capacitor. To form the core of the H inductor, a thin slab of high resistivity magnetic material is cut into bars and each bar is covered with a layer of metal. A bar is double-grooved into the form of an H, leaving a metal layer on each of the remaining surfaces of the bar, followed by cutting the bar into individual cores. The shape of the H core facilitates the winding of the insulated conductor within the two grooves between the two legs of the core to form an inductor. Metal layers remain only on portions of each of the legs of the core for subsequent bonding and electrical connection to a support on one side and a capacitor on the opposite side of the inductor.

A capacitor is made by covering a dielectric bar with a layer of metal on each of two opposite surfaces. A narrow groove is cut completely through the metal layer on one surface of the dielectric bar to form double coplanar plates on that side of the bar, followed by the cutting of the bar into individual double capacitors. A capacitor is mounted on a metal layer on a portion of each leg of the inductor with the slotted side of the capacitor facing the inductor. The reactive circuit thus formed is then connected to the remainder of a larger circuit by mounting the metal layer on another portion of each leg to a conductive pattern on a mounting or support surface, such as a printed circuit board or a thick or thin film substrate. The area of the top surface of the capacitor (the common plate of the double capacitor) is then reduced, if desired, by a flow of abrasive-filled air to tune the reactive circuit formed by the inductor and capacitor.

Figure 1:
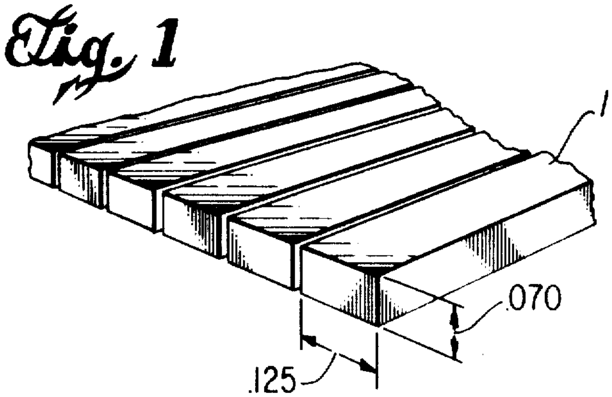
FIG. 1 is a pictorial view, illustrating a number of individual bars of high resistivity magnetic material which have been cut from a single slab.

Referring now to the figures of the drawings, there is illustrated in FIG. 1 a number of individual bars 1 formed by sawing, for example, a slab (not shown) of high resistivity magnetic material, such as a ferrite for example, as the first step in the preparation of a modular reactive circuit containing an inductor in the shape of an H. For most applications, the material used for the core of the inductor must be sufficiently high in volume resistivity so that the material itself does not represent or introduce excessive resistive losses. In addition, the dielectric constant of the material should be low in order not introduce excessive distributed capacitance across the inductor. In rare cases the added losses on the one hand or added distributed capacitance on the other hand, are not detrimental to the performance of the reactive components in the circuit. In these cases, where additional losses or distributed capacitance are not detrimental, a material with a low volume resistivity and/or a high dielectric constant can be used. Consideration of the characteristics of the core material in regard to its volume resistivity and dielectric constant is important because due to the method of forming the metal layers on the core, the electrical contacts to the inductor are made to the metal layer which is intimately bonded to the magnetic material of the core.

The same numerical designations are given in all of the figures where identical parts are described or referred to. Since the primary application of the invention appertains to subminiature modular circuits, some typical dimensions will be given in order to emphasize the extremely small size of the different parts of the circuit. These dimensions are given by way of illustration and are not meant to restrict or limit the invention in any manner whatsoever. In addition, the figures are not drawn to scale in order to clearly illustrate the more important elements of the invention. However, the dimensions in FIGS. 1—5 and 6—11*a* are shown in a relative scale.

The individual bar 1 is covered with a conductive layer by any conventional method. One method that can be used to form the conductive layer is to electroplate a copper layer on the bar. After the bar 1 is electroplated, with a layer of copper, for example, to a thickness adequate to furnish a sufficiently low electrical resistance path when the metal layer is used for subsequent electrical connections, a thin passivating layer of silver is electroplated on the copper covered bar 1 to form the dual metal layer 2 as shown in FIG. 2, the two layers not shown as being differentiated for clarity of illustration.

Depending upon the type of reactive circuit desired, the bar 1 is shaped according to the configuration shown in either FIGS. 3*a* or FIG. 3*b*. A wide groove 3 is formed in the bar 1 of FIG. 2 by conventional means, such as sawing, for example, down the length of each of two opposite metal-covered surfaces of the bar, the grooves being deep enough so that no metal remains in the grooves. The bar is then formed by sawing, for example, into individual cores 4 each having an H configuration as shown in FIG. 3*a*. The ends (not shown) of the bar are discarded so that each core 4 has identical surfaces. Thus, each core 4 has metal layers covering the portions 5*a*—5*b* and 6*a*—6*b* of the two legs 5 and 6, respectively, of the core. The connecting portion of the core 4 between the legs is used for subsequent winding of the conductor to form an H inductor, as shown in FIG. 6.

An alternative configuration of the H core is illustrated in FIG. 3*b*. The wide grooves 3 down the length of two opposite metal-covered surfaces of the bar 1 are formed as described in conjunction with FIG. 3*a*. A narrow groove 8 is also formed in the bar 1 of FIG. 2 by conventional means, such as sawing, for example, down the length of each of the other opposite metal-covered surfaces of the bar. The narrow grooves 8 are deep enough to completely penetrate the metal layers, thereby electrically isolating the leg portions 5*a* and 5*b* from each other and the leg portions 6*a* and 6*b* from each other. After the grooves are formed, the bar is cut into individual cores 7. The ends (not shown) of the grooved bar are discarded, so that each core 7 has identical surfaces. The need for the two core configurations, as shown in FIGS. 3*a* and 3*b*, is explained in relation to subsequent figures.

To form the capacitor for the modular reactive circuit, a slab (not shown) of dielectric material, such as barium titanate, for example, is covered with a metal layer by any convenient method. As explained in conjunction with FIG. 2, one method is to electroplate a layer of copper followed by a layer of silver to form a dual metal layer on the slab. The metal covered slab is divided into individual bars 9 with metal layers 10, as shown in FIG. 4, by any convenient method, such as sawing, for example, the end members (not shown) of the slab being discarded so that each bar has identical surfaces. A narrow groove 11 is formed in one metallized surface of the bar 9, the groove penetrating completely through the layer 10 of metal on that surface to form two separate layers. The metal covered bar 9 is then cut into individual capacitors 12, as shown in FIG. 5, the end members (not shown) being discarded so that each capacitor has identical surfaces. Each capacitor 12 has the common capacitor plate 10*a* with two opposite coplanar capacitor plates 10*b* and 10*c*. It should be noted that the groove 11 actually divides the capacitor 12 into two capacitors in series or a double capacitor with the location of the groove 11 determining the relative values of the two capacitors.

In FIG. 6 is illustrated a completed circuit of the capacitor 12 and the H inductor 13 formed by winding the insulated conductor 14, commonly a copper wire covered by insulation, around the connecting portion of the core 4 and electrically connecting the two ends of the conductor to the metal layers on the leg portions 5*a*—5*b* and 6*a*—6*b*. The operation of the H inductor compares quite favorably with the toroidal-type inductor having a closed loop core. The elimination of the closed loop does not degrade appreciably either the inductance or the Q of the inductor. By not having the closed loop core as in a toroidal inductor, the H core can be much more easily wound with substantial reductions in costs and fabrication time as compared to the toroidal inductor. The ease of winding the H core over the toroidal core is due to the absence of the closed core. The H core can be placed between spindles and rapidly rotated, thereby allowing the conductor to wind on the core, which, of course, is impossible with a closed core. The capacitor 12 is mounted on the inductor 13 with the surface containing the slot 11 facing the inductor 13. The plates 10*b* and 10*c* of the capacitor 12 are electrically connected to the metal layers on the leg portions 5*a* and 6*a*, respectively, by any conventional method, such as soldering, for example, to form a unitized reactive circuit. The bonds between the plates 10*b* and 10*c* of the capacitor 12 and the metal layers on the leg portions 5*a* and 6*a*, respectively, of the inductor 13 complete the electrical connections of the reactive circuit.

Some typical examples of different tunable reactive circuits that are formed in subminiature modular form according to the invention are shown in FIGS. 7*a*—11*b*. An antiresonant circuit having an H inductor 13 and a capacitor 12 is shown connected to a conductive pattern on the support 15 in FIG. 7*a* with the equivalent electrical circuit being shown in FIG. 7*b*. The capacitor 12 is connected to the inductor 13 by the method as described in conjunction with FIG. 6. The reactive circuit is mounted on the support 15, which can be a conventional printed circuit board or alumina substrate, for example, having conductive connecting pads A and B. The metal layer on the leg portion, 5*b* of the inductor 13 is bonded to the connecting pad B by any conventional method such as soldering, for example, with the metal layer on the corresponding leg portion 6*b* bonded to the connecting pad A. One end of the conductor 14 is bonded to the electrically common metal layers on leg portions 6*a* and 6*b*. The opposite end of the conductor is bonded to the electrically common metal layers on the leg portions 5*a* and 5*b*. The completed reactive circuit is electrically connected through the connecting pads A and B to the remainder of the circuit of which the reactive circuit is a part. The reactive circuit is tuned to furnish the desired circuit frequency response by removing, if necessary, a portion 17 of the top plate 10*a* of the capacitor 12 by the use of a flow of abrasive-filled air, for example.

A resonant circuit is shown in FIG. 8*a* with the equivalent electrical circuit being shown in FIG. 8*b*. The capacitor 12 is connected to the inductor 16 by the method as described in conjunction with FIG. 6. The metal layers on the leg portions 6a and 6b are electrically isolated from each other by the formation of groove 8 during fabrication of the core 7 as explained in conjunction with FIG. 3b, with the exception that the groove 8 between the metal layers on the leg portions 5a and 5b is omitted during fabrication of the core. The metal layers on the leg portions 5b and 6b are bonded to the connecting pads B and A, respectively, of the support 15 and one end of the conductor 14 is connected to the metal layer on the leg portion 6b while the opposite end is connected to the metal layer on the leg portion 6a to complete the resonant circuit. As explained in conjunction with FIG. 7a, the capacitor 12 is adjusted by removing, if necessary, a portion 17 of the top plate 10a by a flow of abrasive-filled air.

A unique feature of the invention is that of providing a convenient takeoff point for impedance transformation. The added cost of providing an intermediate tap on the inductor would prove to be a prohibitive factor in the manufacture of the circuit. An antiresonant circuit with an impedance transforming tap is shown in FIG. 9a with the equivalent electrical circuit being shown in FIG. 9b. The metal layers on the leg portions 5b and 6b are bonded to the connecting pads B and A, respectively, of the support 15, with the bottom plates 10b and 10c of the capacitor 12 being bonded to the metal layers on the leg portions 5a and 6a, respectively. The ends of the conductor 14 are connected to the electrically common metal layers of the leg portions 5a—5b and 6a—6a—6b of the inductor 13. An intermediate transforming tap is made to the top plate 10a of the capacitor 12 by a metal strip 21 connected between the top plate 10a and the connecting pad C on the substrate 15. The impedances between terminals B and C and terminals A and C of the reactive circuit are fractional parts of the total impedance between terminals A and B. The impedance ratio between the two capacitors (10b—10a and 10c—10a) is determined by the location of the slot 11 and is limited by the spacing between the legs 5 and 6 of the H core.

Referring back to FIG. 6 which shows some dimensions of a typical subminiature reactive circuit, the dimensions between the leg portions 5a and 6a of the inductor 13 is 0.065 inch wide which allows 0.030 inch for the width of each leg, the total width being 0.125 inch. Allowing 0.005 inch for the width of the groove 11 between the bottom plates 10b and 10c of the capacitor 12, a maximum ratio of plates areas is obtained of about 0.090:0.030 or 3 to 1. The ratio of the impedance thus formed at tap C in FIG. 9a by the capacitor ratios can then be made to vary anywhere from about 1/16 or 6.7 percent of the total antiresonant impedance to 9/16 or 56.2 percent of the total antiresonant impedance, depending on the actual location of the groove 11 between the two bottom plates of the capacitor. The location of the groove 11 shown in FIG. 9a furnishes the maximum impedance ratio of (1/16) at tap C. The location (not shown) of the groove 11 adjacent the leg portion 5a of FIG. 9a would furnish the minimum impedance ratio of (9/16) at tap C. The capacitor 12 is adjusted by the use of a flow of abrasive-filled air to remove a portion 17 of the top capacitor plate 10a. The air abrasion of the upper plate 10a of the capacitor must be directed so as to maintain a constant ratio of capacitance between each of the bottom conducting surfaces, or plates 10b and 10c, and their common upper conductive surface, or plate 10a, both during the air abrasion operation and the termination of air abrasion. Otherwise, the transformation ratio will vary excessively both during and at the termination of adjustment. In the case of the simple nontapped versions of FIGS. 7a and 8a, the actual location of the air-abraded portion 17 is not critical. For the sake of clarity, not all of the figures show the removed portion 17 of the top plate 10a caused by adjusting the capacitor 12 with the air abrasion technique. However, all of the reactive circuits can be so tuned, if desired.

A series resonant circuit with an impedance transforming tap is shown in FIG. 10a with the equivalent electrical circuit being shown in FIG. 10b. The metal layers on the leg portions 5b and 6b of the inductor 16 are bonded to the connecting pads B and A, respectively, of the support 15. The capacitor 12 is connected to the inductor 16 by bonding the bottom capacitor plates 10b and 10c to the metal layers on the leg portions 5a and 6a, respectively, of the inductor 16. One end of the conductor 14 is connected to the metal layer on the leg portion 6a while the opposite end is connected to the metal layer on the leg portion 6b. The metal layers of leg portions 6a and 6b are electrically isolated by a groove 8 as described in conjunction with FIG. 3b. As was true for the inductor 16 described in conjunction with FIG. 8a, the core 7 is made by omitting the groove between leg portions 5a and 5 b. An impedance transforming tap to the capacitor 12 is formed by connecting a metal strip 21 between the top capacitor plate 10a and the connecting pad C on the support 15.

A modular circuit having a transformer 30 with a tunable primary (or secondary) winding and an untunable secondary (or primary) winding is shown in FIG. 11a with the equivalent electrical circuit being shown in FIG. 11b. The metal layers on the leg portions 5b and 6b of the transformer 30 are bonded to the connecting pads B and A, respectively of the support 15. The capacitor 12 is connected to the transformer 30 by bonding the bottom capacitor plates 10a and 10c to the metal strips 33 and 35, respectively, which are in turn bonded to the metal layers on leg portions 5a and 6a, respectively. One end of the conductor 31 is connected to the metal layer on the leg portion 6b while the other end is connected to the metal layer on the leg portion 5b. A second conductor 32 is wound in a bifilar relationship with the conductor 31. One end of the conductor 32 is connected to the metal layer on the leg portion 6a while the opposite end is connected to the metal layer on the leg portion 5a. The connecting pad C is connected to the metal layer on the leg portion 5a and capacitor plate 10a by a metal strip 33 while the metal strip 34 connects the top or common plate 10a with the connecting pad D. The connecting strip 35 connects the metal layer on the leg portion 6a and capacitor plate 10c to the connecting pad E. Although the capacitor 12 has been shown as a part of the primary circuit, it is obvious that there is no reason why this part of the circuit cannot be the secondary of the circuit.

It can be seen that the combination of the inductor or transformer and the capacitor with an appropriately formed conductor patterned substrate lends itself to a plurality of desired reactive circuit configurations. In addition, when the reactive circuit assembly is to be used with integrated circuits, the assembly itself makes a very good support for such integrated circuits which can be bonded onto any of the exposed planar surfaces of the assemblage, such as the top plate 10a of the capacitor 12, for example, to form a very complex electrical circuit configuration.

The television video IF amplifier circuit module 40 as shown in FIG. 12 clearly illustrates the use of a number of different reactive circuits 41 to form a complete circuit, in this case, for television application. The entire video amplifier is accommodated on a single alumina support 15 and demonstrates the high degree of component density realizable in linear hybrid integrated circuits using the method of the invention. The resultant module 40 measures only 0.50 × 0.625 × 0.200 inch and incorporates tunable reactive circuits 41, fixed capacitors 42, monolithic integrated circuits 43 and a fixed coupling capacitor 44, most of which are connected to conductive patterns on the substrate 15.

Various modifications of the invention will become apparent to persons skilled in the art without departing from the spirit and scope of the inventions.

What I claim is:

1. A bifilar transformer, comprising:

a. a core of high resistivity magnetic material, said core being generally in the shape of an H having two legs joined by a connecting portion, b. metal layers covering portions of each of said legs, and c. two insulated conductors severally wound on said center portion in a bifilar relationship, said conductors being electrically isolated from each other, each end of said two conductors being electrically connected to one of said metal layers.

2. The bifilar transformer of claim 1 further including:

a. a capacitive element having one common plate and two opposite plates, said opposite plates being respectively secured to the ends of said core; wherein b. said two opposite plates being respectively connected to the ends of one of said conductors; thereby c. forming a parallel LC reactive circuit having its capacitor coupled across said bifilar transformer.

3. The bifilar transformer of claim 2 and further including:

a. a conductor connected to said common plate to form a takeoff point for impedance transformation.

4. A modular reactive circuit comprising:

a. an inductor having a core of high resistivity magnetic material, said core being generally in the shape of an H having two legs joined by a connecting portion, an insulated conductor wound around said center portion, and metal layers covering portions of said legs, the ends of said conductor being electrically connected to certain of said metal layers, and b. a capacitor mounted on said inductor, said capacitor having one common plate and two opposite plates separated from said common plate by dielectric material, one of said opposite plates being electrically isolated from and coplanar with the other of said opposite plates, said one of said opposite plates being electrically connected to the metal layer on one portion of one of said two legs and the other of said opposite plates being electrically connected to the metal layer on one portion of the other of said two legs.

5. The reactive circuit as defined in claim 4, including: at least one impedance transforming tap electrically connected to said common plate of said capacitor.

6. The reactive circuit as defined in claim 4, including: a support for said circuit, said support having conductive connecting pads thereon, the metal layer on another portion of each of said two legs being electrically connected to one of said conductive connecting pads.

7. A subminiature reactive circuit comprising in combination:

a. a core of high resistivity magnetic material having at least two legs joined by a connecting portion, each of said legs having a major surface and two ends;

b. at least one conductor wound around said connecting portion;

c. conductive layers selectively covering at least portions of the major surface and one end of each of said legs and secured thereto; and d. a capacitive element having at least two conductive plates separated by a dielectric material, said capacitive element being secured to the conductive layer on said ends of said legs; whereby e. the ends of said conductor are selectively secured to said conductive layers to form an LC reactive circuit.

8. The subminiature reactive circuit of claim 7 wherein:

a. said capacitive element has one common plate and two opposite plates, said opposite plates being respectively secured to the conductive layers on said one end of said legs; and wherein b. said conductor ends are respectively secured to the conductive layers on the major surfaces of said legs; thereby c. forming a parallel LC reactive circuit.

9. The subminiature reactive circuit of claim 8 and further including a conductor connected to said common plate to form a takeoff point for impedance transformation.

10. The subminiature reactive circuit of claim 7 wherein:

a. The conductive layer selectively covering the major surface of one of said legs comprises first and second portions electrically isolated from each other; and wherein b. said capacitive element has one common plate and two opposite plates, said opposite plates being respectively secured to the conductive layers on said one end of said legs; and c. said conductor ends are respectively secured to said first and second portions, thereby d. forming a series LC reactive circuit.

11. The subminiature reactive circuit of claim 10 and further including a conductor connected to said common plate to form a takeoff point for impedance transformation.

12. The subminiature reactive circuit of claim 7 wherein:

a. two conductors are wound around said central portion; and wherein b. each of the conductive layers selectively covering the major surface of said legs comprise first and second portions electrically isolated from each other; and wherein c. said capacitive element has one common plate and two opposite plates, said opposite plates being respectively secured to the conductive layers on said one end of said legs; and wherein d. one end of each conductor is respectively secured to said first and second portions of the conductive layer on the major surface of the other one of said legs; thereby e. forming a parallel LC reactive circuit having its inductor inductively coupled to a second inductor.

13. The subminiature reactive circuit of claim 12 and further including a conductor connected to said common plate to form a takeoff point for impedance transformation.

14. A modular reactive circuit comprising:

a. a transformer having a core of high resistivity magnetic material, said core being generally in the shape of an H having two legs joined by a connecting portion, two insulated conductors severally wound around said connecting portion in a bifilar relationship, said conductors being electrically isolated from each other, and metal layers covering portions of said legs, each end of said two conductors being electrically connected to one of said metal layers, and b. a capacitor mounted on said transformer, said capacitor having one common plate and two opposite plates separated from said common plate by dielectric material, one of said opposite plates being electrically isolated from and coplanar with the other of said opposite plates, said one of said opposite plates being electrically connected to the metal layer on a portion of one of said two legs and the other of said opposite plates being electrically connected to the metal layer on a portion of the other of said two legs.